US010366057B2

(12) United States Patent
Morris et al.

(10) Patent No.: US 10,366,057 B2
(45) Date of Patent: Jul. 30, 2019

(54) DESIGNATED COMPUTING GROUPS OR POOLS OF RESOURCES FOR STORING AND PROCESSING DATA BASED ON ITS CHARACTERISTICS

(71) Applicant: TERADATA US, INC., Dayton, OH (US)

(72) Inventors: John Mark Morris, San Diego, CA (US); Donald Raymond Pederson, San Diego, CA (US); Douglas P. Brown, Rancho Santa Fe, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 13/901,851

(22) Filed: May 24, 2013

(65) Prior Publication Data

US 2014/0188884 A1 Jul. 3, 2014

Related U.S. Application Data

(60) Provisional application No. 61/747,659, filed on Dec. 31, 2012.

(51) Int. Cl.
*G06F 16/00* (2019.01)
*G06F 16/21* (2019.01)
*G06F 16/28* (2019.01)
(52) U.S. Cl.
CPC ............ *G06F 16/21* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 2002/0023077 A1* | 2/2002 | Nguyen | G06F 17/30696 |
| 2002/0112094 A1* | 8/2002 | Pederson | G06F 17/30371 |
| | | | 719/330 |
| 2003/0069975 A1* | 4/2003 | Abjanic et al. | 709/227 |
| 2003/0120715 A1* | 6/2003 | Johnson et al. | 709/201 |
| 2003/0191908 A1* | 10/2003 | Cohn | G06F 3/0601 |
| | | | 711/153 |
| 2011/0302151 A1* | 12/2011 | Abadi | G06F 17/30445 |
| | | | 707/714 |
| 2015/0205674 A1* | 7/2015 | Schroth | G06F 11/1458 |
| | | | 707/649 |

* cited by examiner

*Primary Examiner* — Son T Hoang
(74) *Attorney, Agent, or Firm* — Ramin Mahboubian

(57) ABSTRACT

Data or one or more operations can be provided, based on one or more characteristics associated with the data and/or operations, to a designated computing group or pool of computing resources designated for handling the data and/or operations with the particular data characteristic(s). The designated computing group can, for example, be one of multiple computing groups in the same system or device. As such, all of the computing groups can still function together in the same system or device, for example, in parallel. However, each one of the multiple computing groups can, for example, be defined or predefined to include one or more computing resources that are more suitable for storing and/or processing data with one or more data characteristics or handle operations with one or more determined characteristics.

8 Claims, 6 Drawing Sheets

DESIGNATED COMPUTING GROUPS OR POOLS OF RESOURCES FOR STORING AND PROCESSING DATA BASED ON ITS CHARACTERISTICS

CROSS-REFERENCE TO RELATED CASES

This application is takes priority from the U.S. Provisional Patent Application No. 61/747,659, entitled: "DESIGNATED COMPUTING GROUPS OR POOLS OF RESOURCES FOR STORING AND PROCESSING DATA BASED ON ITS CHARACTERISTICS," by John Mark Morris et al., filed on Dec. 31, 2012, which is hereby incorporated by reference herein in its entirety and for all purposes.

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, storing and processing data are important aspects of computing and computing systems is storage of data. Today, there is an ever increasing need to manage storage and processing of data in computing environments. Databases provide a very good example of a computing environment or system where the storage and processing of data can be crucial. As such, to provide an example, databases are discussed below in greater detail.

The term database can also refer to a collection of data and/or data structures typically stored in a digital form. Data can be stored in a database for various reasons and to serve various entities or "users." Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

As those skilled in the art readily appreciate, generally, processing data presents many challenges, especially, in database systems.

In view of the foregoing, techniques for storing and processing data (e.g., storing data in a database, manipulating data, processing database requests) in computing systems and environments, especially database systems and environments are highly useful.

SUMMARY

Broadly speaking, the invention relates to computing environments and systems. More particularly, the invention relates to techniques for processing data in computing environments and systems, including database environments and systems.

In accordance with one aspect of the invention, data or one or more operations can be provided, based on one or more characteristics associated with the data and/or operations, to a designated computing group or pool of computing resources that is designated for handling the data and/or operations with the particular data characteristic(s). The designated computing group can be one of multiple computing groups in the same system or device. As such, all of the computing groups can still function together. However, each one of the multiple computing groups can, for example, be defined or predefined to include one or more computing resources that are especially suitable for storing and/or processing data with one or more determined data characteristics or handle operations with one or more determined characteristics or associated with data with one or more determined characteristics.

For example, in one embodiment, multiple computing groups can be associated with multiple database nodes (or nodes) of a parallel (or multiprocessing) database system, or one or more processing units of a single node of database system with multiple nodes. In the example, one or more database nodes, or processing units in a database node, can be designated to store and/or process a particular type, kind or form of data, or data with a particular attribute (or more generally data characteristic), for example, data stored without using a Primary Index (PI) or (NOPI data). It will be appreciated that the one or more database nodes or processing units can be selected such that they are more suited for processing a particular data characteristic (e.g., NOPI data). As such, data can be effectively provided for storage and processing to a computing group or pool of resources that may be better suited to handle it inside the same device or system where it is also possible to use all the resources of computing groups as well when there is a need to do so or when there may not be a benefit in choosing one computing group over another.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1A:
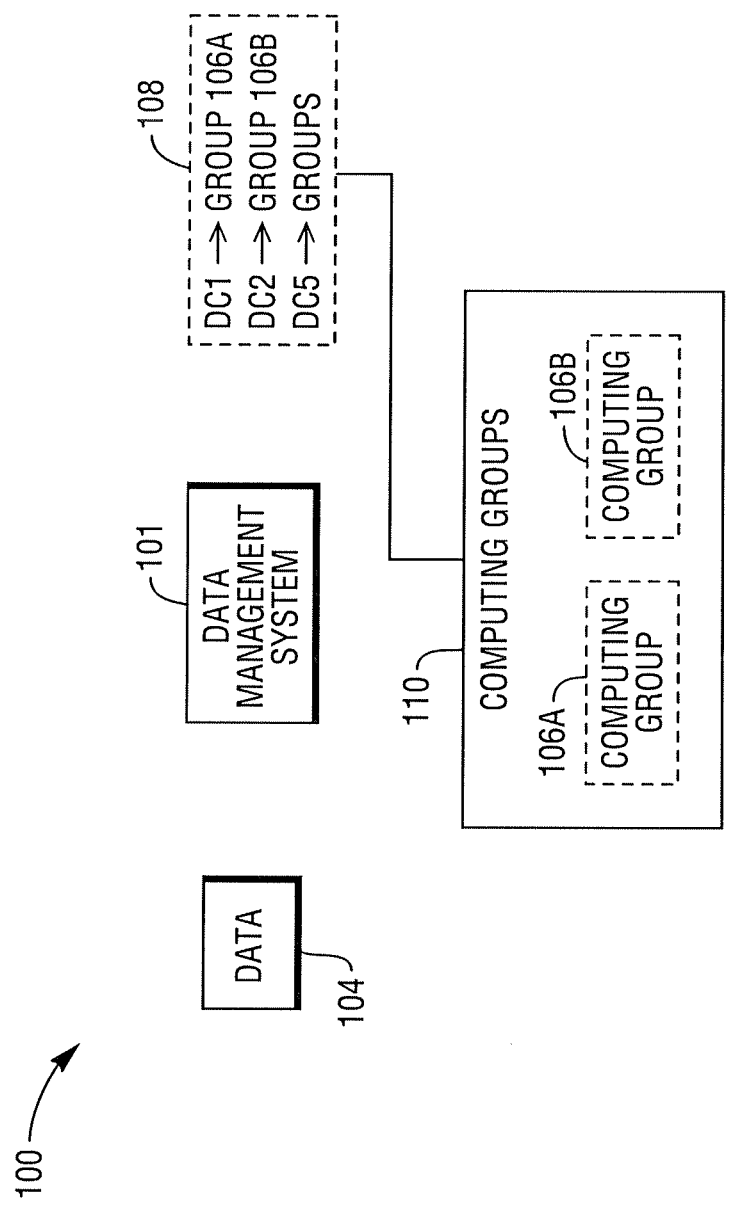
FIG. 1A depicts a computing environment with a data management system in accordance with one embodiment of the invention.

As noted in the background section, techniques for processing data (e.g., storing data, manipulating data, processing database requests) in computing systems and environments, especially database systems and environments are highly useful.

Storing and processing data in computing environments and systems still presents many challenges, especially, in database environments and systems. For example, typically, in database systems data is organized and stored by using one or more indexes, including a Primary Index (PI) in order to facilitate more efficient processing data. However, data can also be stored in a database without using an index or hashing scheme, for example, without using a Primary Index, as No Primary Index (or NOPI) data in order to facilitate more efficient processing some database operations (e.g., loading or storing relatively large amount of data that may or not later be indexed). In other words, a database can store some data as PI data and some other data as NOPI data in order to improve the overall efficiency of the database.

Generally, conventional techniques address many issues and challenges associated with storage and processing data. However, conventional techniques do not take into account the characteristics of data at least to the extent that these data characteristics can be considered in storing and processing data. For example, although a database can store both PI and NOPI data, conventionally, data is stored and processing by the same resources. In other words, PI and NOPI data can be conventionally stored on the same storage device and processing by the same processors despite their characteristics that may vary widely.

In view of the foregoing, improved techniques for storing and processing data in computing system and environments, especially database environments are needed and would be highly useful.

Accordingly, improved techniques for storing and processing data in computing system and environments are disclosed.

More specifically, it will be appreciated that data or one or more operations can be provided, based on one or more characteristics associated with the data or operations, to a designated computing group or pool of computing resources that is designated for handling the data and/or operations with the particular data characteristic(s) in accordance with one aspect of the invention. The designated computing group can be one of multiple computing groups in the same system or device. As such, all of the computing groups can still function together. However, each one of the multiple computing groups can, for example, be defined or predefined to include one or more computing resources that are especially suitable for storing and/or processing data with one or more determined data characteristics or handle operations with one or more determined characteristics or associated with data with one or more determined characteristics.

For example, in one embodiment, multiple computing groups can be associated with multiple database nodes (or nodes) of a parallel (or multiprocessing) database system, or one or more processing units of a single node of database system with multiple nodes. In the example, one or more database nodes, or processing units in a database node, can be designated to store and/or process a particular type, kind or form of data, or data with a particular attribute (or more generally data characteristic), for example, NOPI data. It will be appreciated that the one or more database nodes or processing units can be selected such that they are more suited for processing a particular data characteristic (e.g., NOPI data). As such, data can be effectively provided for storage and processing to a computing group or pool of resources that may be better suited to handle it inside the same device or system where it is also possible to use all the resources of computing groups as well when there is a need to do so or when there may not be a benefit in choosing one computing group over another.

Embodiments of these aspects of the invention are also discussed below with reference to FIGS. 1A-6. However, those skilled in the art will readily appreciate that the detailed description given herein with respect to these figures is for explanatory purposes as the invention extends beyond these limited embodiments.

FIG. 1A depicts a computing environment 100 with a data management system 101 in accordance with one embodiment of the invention. Referring to FIG. 1A, the data management system 101 can effectively facilitate and/or manage computing of data 104 in the computing environment 100. Computing of the data can, for example, include storage, processing, as well as other activities associated with storage and processing of the data (e.g., data organization, data maintenance, data compression).

More particularly, the data management system 102 can facilitate storage and/or processing of data 104 in one of multiple groups of computing resources 106A and 106B selected for doing so, based on one or more characteristics (or data characteristics) associated with the data 104. Typically, data 102 can be provided for storage and processing by one of the computing resources 106A and 106B that is deemed more suitable for computing of the data 102 based on one or more characteristics of the data 102 (e.g., frequently of data usage, indexed or non-indexed data).

In the computing environment 100, each one of the computing groups 106A and 106B can include one or more computing resources, including various hardware and software components that are designated to be part of that computing group. Although a computing group 106A or 106B can be defined to have only one computing resource (e.g., a single storage device), it will be appreciated that multiple computing resources with the same or similar can be grouped together for more effective processing, especially in parallel processing system.

Generally, computing resources that are grouped as a computing group 106A or 106B can be of the same or similar type or capabilities. For example, two or processors or storage devices of the same exact type or model can be grouped together, or two of more processors or storage devices of the same or similar type with the same or similar capabilities, but no necessary exactly alike can be grouped in computing group 106A or 106B (e.g., two hardware drives with different storage capacities) and so on. In any case, a computing group 106A or 106B can be formed as a group or pool of computing resources selected and/or designated for storing and/or processing of the data of a particular data characteristic(s).

As suggested by FIG. 1A, data characteristics (DC1-DC2) can be effectively mapped to the computing groups or groups of the computing resources 106A and 106B in a map or mapping 108. By way of example, data that is indexed and/or more frequently used can be mapped as a data characteristics DC1 to the computing group 106A for storage and/or processing, whereas data that is not indexed and/or less frequently used can be mapped to the computing group 106B for storage and/or processing. It should be noted that each one of the computing groups 106A and 106B can be selected as independent processing units with one or more processes (e.g., CPUs) and one or more storage devices (RAM memory, SSD, disk drives). However, as suggested by FIG. 1A, the computing groups 106A and 106B can be part of the same computing device (e.g., a computer, a database system) 110.

As will be described in a greater detail below, all of the computing resources of the computing device 110 can be grouped as a group (core, special, super, or all inclusive group) designated for storing processing data with one or more associated data characteristics that may be more suitable for storage and/or processing across all the computing resources of the computing device 110. As such, for example, a computing group that includes both computing groups 106A and 106B can be formed and used for storage and/or processing of some data across multiple computing resources in the computing groups 106A and 106B. Hence, referring to the map 108, a third computing group (group S) can be formed as the combination of computing groups 106A and 106B and be mapped to one or more data characteristics (DCS), for example, as data requiring processing by all of the processors in the computing device 110.

Alternatively, only two computing groups can be defined, one that may include all the computing resources in the computing device, and one that includes only a subset of the computing resources in the computing device (e.g., computing group 106A, computing group 106B).

Although depicted as a separate component in FIG. 1, those skilled in the art will readily appreciate that the data management system 102 can also be part of the computing device 110. Those skilled in the art will also readily appreciate that the data management system 102 can be provided as one or more hardware and/or software components, for example, at least in part as computer executable code stored in a computer readable storage medium (not shown) and executed by one or more processors (not shown).

Figure 1B:
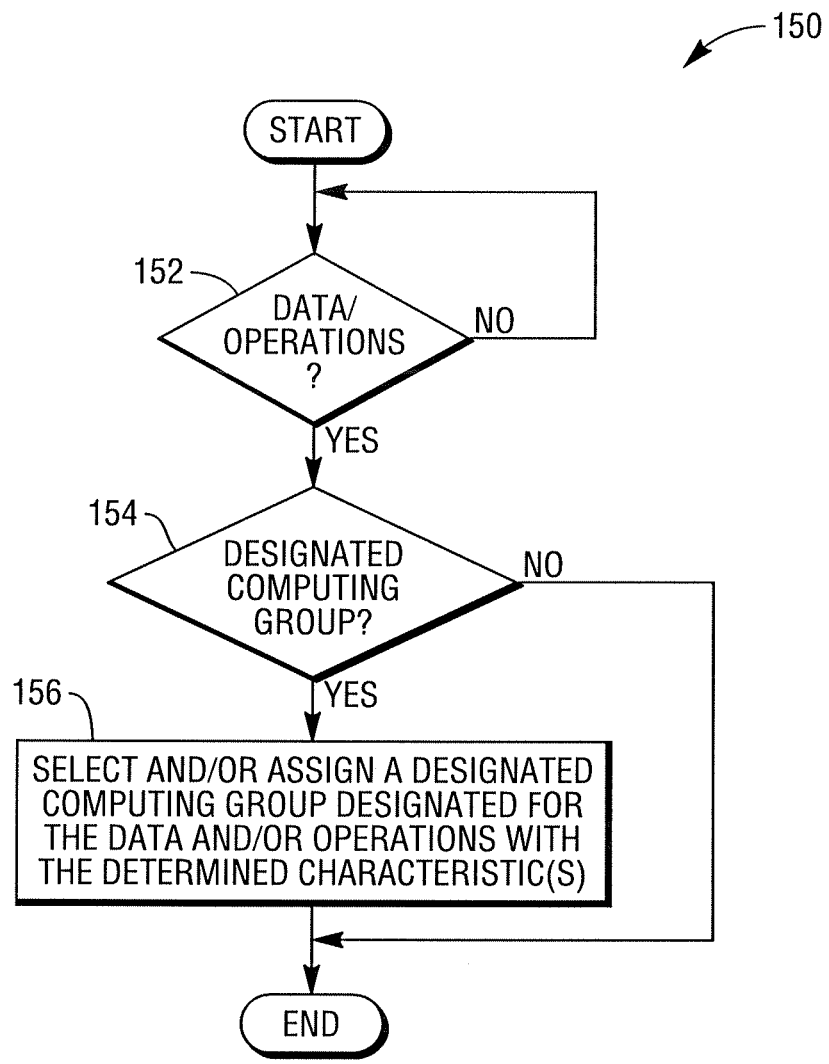
FIG. 1B depicts a method for handling data and/or one or more operations associated with the data in a computing system (e.g., a device, a database system) that includes multiple computing resources in accordance with one embodiment of the invention.

To further elaborate, FIG. 1B depicts a method 150 for handling data and/or one or more operations associated with the data in a computing system (e.g., a device, a database system) that includes multiple computing resources in accordance with one embodiment of the invention. Method 150 can, for example, be used by the device 110 of FIG. 110.

Referring to FIG. 1B, initially, it is determined (152) whether data and/or one or more operations associated with data are to be handled by the computing system. Handling of the data can, for example, include distributing, storing, and or processing of the data. One or more operations associated with the data can, for example, be a processing a database query or operation (e.g., insert, delete). Generally, data can be handled with respect to at least operation. It should be noted that each one of the multiple computing groups of computing resources can include one or more computing resources of the computing system which are designated to be part of that computing group.

Referring back to FIG. 1B, if it is determined (152) that data and/or operations are to be handled, based on one or more characteristics of data and/or operations associated with the data, it can be determined (152) whether to assign or select a computing group that has been designated to handle the data and/or operations with the one or more determined characteristics. Accordingly, based on one or more characteristics associated with the data and/or operation(s), a computing group can be selected or assign to handle the data and/or operations associated with the data, before the method 150 ends.

It will be appreciated that the data management system 102 (shown in FIG. 1A) is especially suitable for parallel processing computing devices. As such, the data management system 102 is described further in the context of a computing device 200 that includes multiple computing groups (or pools) or computing resources that each are capable of independently storing and processing data but may also be configured to communicate and/or work together to handle data and/or one or more operations associated with the data.

Figure 2:
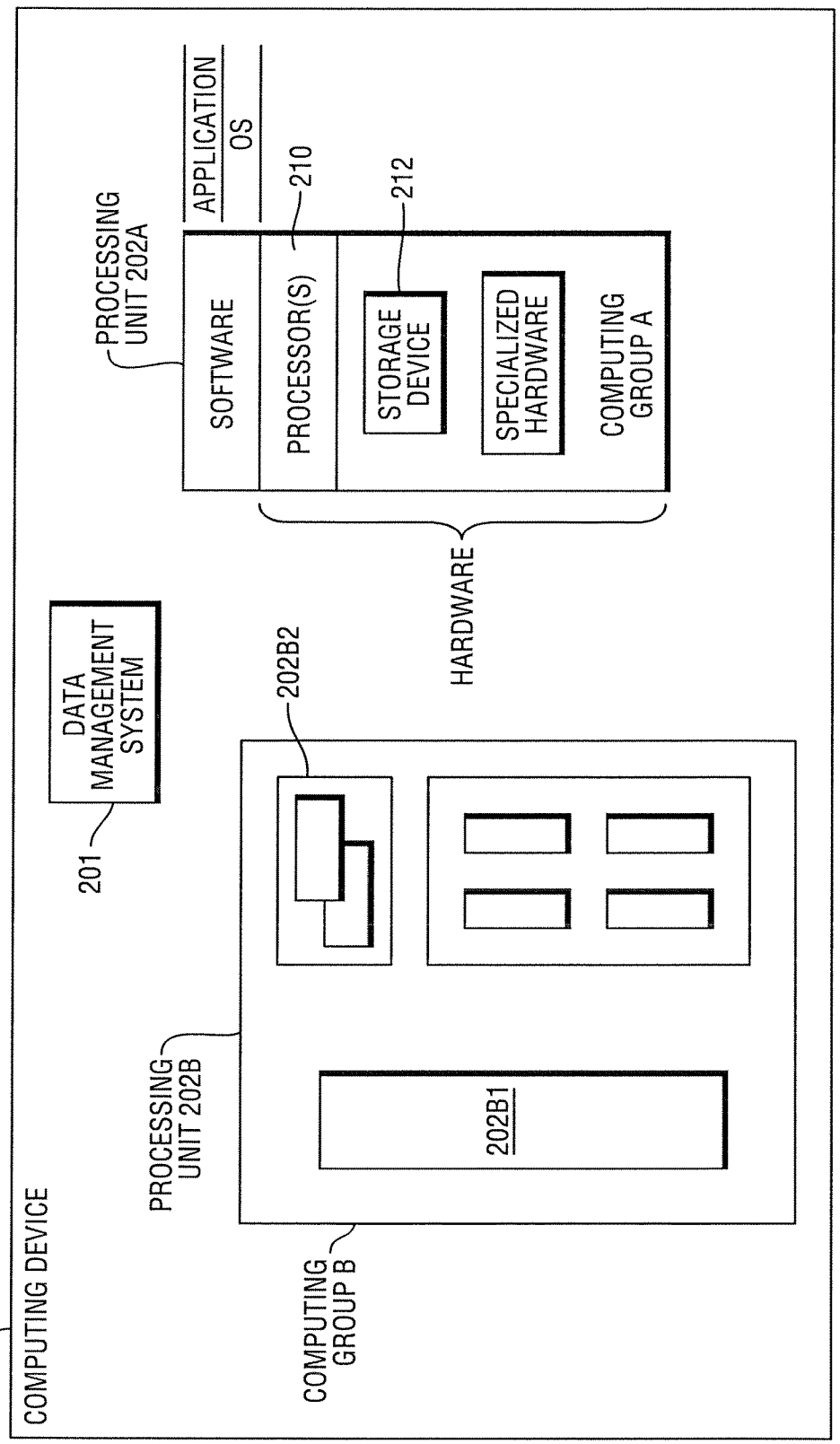
FIG. 2 depicts a data management system in a computing device capable of processing data using at least two processing units in accordance with one embodiment of the invention.

To further elaborate, FIG. 2 depicts a data management system 201 in a computing device 200 capable of processing data using at least two processing units 202A and 202B in accordance with one embodiment of the invention. It should be noted that each of the processing units 202 includes one or more processors 210 configured to process data in the processing unit. As such, each one of the processing units 202A and 202B can process data independently of the other processing unit even though the processing units 202A and 202B can also be configured to effectively work together to process data and/or can be configured to effectively communicate with each other. Moreover, one or both of the processing units 202A and 202B can represent a computing group designated to process data or operations based on more of more determined characteristics of data and/or operations, similar to the data management system 102 (shown in FIG. 1).

As suggested by FIG. 2, a processing unit 202A can conceptually be represented with a software layer and a hardware layer. A software layer may have various sub-layers, including, for example, an application or tool layer, an Operating System layer, as well other others (e.g., communication layer) and so on. Similarly, in addition to one or more processors 210, the hardware layer of a processing unit 202A, can also include various other hardware components, including one or more storage devices 212, as well as other components, such as, for example, graphical processing units, specialized hardware provided for one or more other functionalities (e.g., data compression, columnar, FPGA).

In any case, each one of processing units 202A and 202B can respectively represent a computing group A and B that includes at least one processor provided to independently process data. However, additional hardware or software components can also be grouped in a computing group.

It should be noted that a processing unit 202A and 202 B can include multiple processing (or sub-processing) units provided as physical processors and/or virtual processors as those skilled in the art will readily appreciate. As suggested by the computing group 202B, multiple hardware and software components can be effectively grouped or pooled together to make processing units 202B1 or 202B2 which can represent a computing group B or processing unit 202B.

To facilitate effective parallel processing in a computing group, the computing resources grouped together as a computing group A or B (or possibly B1 or B2) can have the same or similar characteristics. By way of example, multiple processors with relatively less processing speed or power can be grouped in the computing group or pool 202B, whereas multiple processors with relatively more processing speed or power can be grouped in the computing group or pool 202A. In the example, multiple storage devices of relatively larger capacity, but of slower access times, can be grouped in the computing group or pool 202B, whereas storage devices of relatively smaller capacity, but of faster access times can be grouped in the computing group or pool 202A. Similarly, a first Operating System (O.S.) and/or utilities can be used the computing group or pool 202B, whereas a second O.S. and/or utilities, different than the first, can be used the computing group or pool 202A.

In this example, the data management system 201 can, for example, facilitate storage of data that is not organized (e.g., non-indexed data) and/or is less frequently used (or likely used) in the computing group or pool 202B with its larger capacity but slower access time for retrieval of data as well of slower processing of the data. However, the data management system 102 would facilitate storage of data that is organized (e.g., indexed) and/or is more frequently used (or likely used) in the computing group or pool 202A with its smaller capacity but faster access time for retrieval and faster processing of the data.

It should be noted that computing groups or pools 202A and 202B can be grouped together to form a super or core computing group S that may include all of the computing resources of the computing device 200. This super or core computing group S can be useful in cases when there is a need to utilize all of the resources of the computing device 200. For example, in context of a database system, a database request or operation that requires data or processing power of both of the computing groups 202A and 202B would be assigned to the super group S, whereas a data operation for loading non-indexed (e.g., NOPI data) can be assigned to the computing group 202B, or a database query requiring only indexed data can be assigned to the computing group 202A.

It will be appreciated that the data management system 201 can be provided, for example, for a database system that includes the computing device 200. Given the prevalence of databases, a data management system for a parallel database or database system will be discussed in greater detail below.

Figure 3:
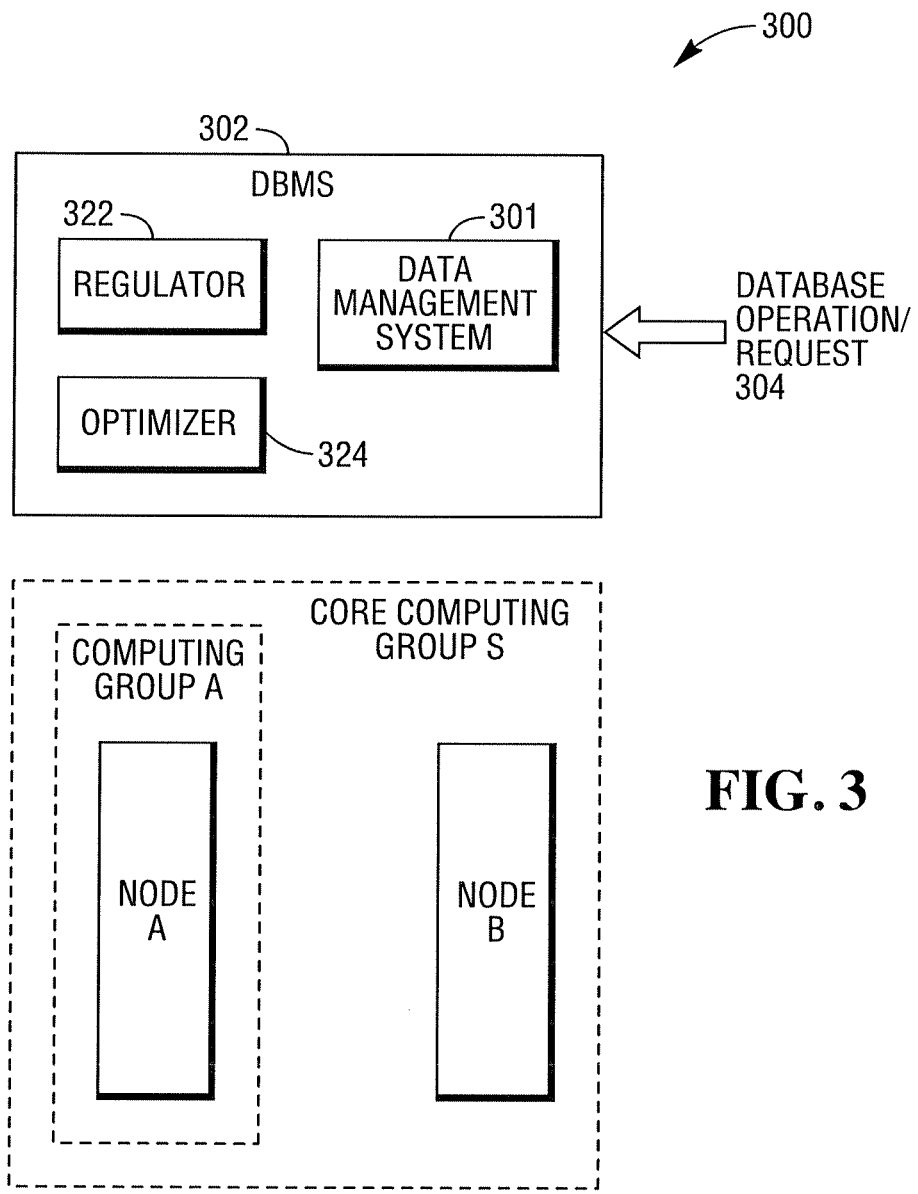
FIG. 3 depicts a data management system provided as a part of a DBMS system in a database environment in accordance with one embodiment of the invention.

To elaborate further, FIG. 3 depicts a data management system 301 provided as a part of a DBMS system 302 in a database environment 300 in accordance with one embodiment of the invention. Referring to FIG. 3, the data management system 301 can effectively assign one or more database operations or requests 304 to one of multiple defined computing groups or pools, including a core computing group S that includes all the computing resources in of the computing nodes A and B, and a computing group A that includes node A but not node B. Of course, if desired a computing group B that includes node B but not node A can be defined. It should be noted that the Nodes A and B can be operate be configured as parallel computing nodes providing computing resources (e.g., processors, memory, storage units) that can be used in parallel.

In any case, the data management system 301 can facilitate processing of the database operation(s) or request(s) 304 based on the one or more characteristics associated with the data and/or operation(s). By way of example, a database request 304 to load NOPI data can be effectively assigned to the computing group A which can also be designated to store NOPI data in one or more of its storage devices that have been selected specifically to store NOPI data and may be more suitable for storing NOPI data (e.g., large capacity Hard Disk Drives (HDD)), whereas a database request the involves PI data may be directed to computing group S which also includes node B where PI data is stored using storage devices that have been selected and arranged specifically to store PI data (e.g., memory and SSD drives using a caching scheme).

Referring to FIG. 3, it should be noted that decisions regarding assignment of a database request or operation 304, in part or as a whole, can be made at least in part by an optimizer 320 and/or a regulator 322 as those skilled in the art will readily appreciate. By way of example, an optimizer 342 can be configured to select a computing group or pool for handling a particular database request or operation 304 (e.g., loading NOPI data, a complex database query). In the example, the optimizer may provide a number of options for effectively assigning the database request or operation 304 to computing group A or S. However, a regulator 322 can also be utilized to ultimately decide which computing group should process the database request or operation 304, for example, based on usage information indicative of current utilization of each one of the computing group A or S.

Additional information regarding a regulator 322 that can be provided for making decision regarding assignment of the database request(s) or operation(s) 304, is, for example, described in the U.S. Pat. No. 7,702,676, entitled: "PARALLEL VIRTUAL OPTIMIZATION," by Brown et al., which is hereby incorporated by reference herein, in its entirety and for all purposes.

Generally, the database management system 301 can be configured to communicate with the optimizer 324 and/or a regulator 322, directly or indirectly, and the decision regarding the assignment of database request(s) or operation 304(*s*) can be made by one of these components alone, or by two, or all three of them collaboratively as those skilled in the art will readily appreciate.

It should be noted that in context of a parallel database system where multiple computing nodes (or nodes) can be readily provided, nodes can be grouped together and designated as computing groups for storage and processing of various data types determined based on one more characteristics of the data. Typically, it is desirable to group nodes with similar computing resources and characteristics together as a computing group to allow for effective parallel processing in the nodes to avoid bottle necks inside a single computing group as components of higher capability may have to wait for components of lesser capability.

In a parallel database system, typically, each node can have multiple processing units capable of independently processing data from at least one or more processors of another node. The processors of a node arranged in a computing group can be selected to be the same or similar processors but the processors and consequently computing groups can differ widely across the computing nodes. A node can also typically include one or more storage devices of the same or similar type but the storage devices can differ widely across the nodes. Similar, software or specialized hardware can vary widely across the nodes.

By way of example, in parallel database system, a number of nodes or processing units can be grouped together to form a NOPI group or pool designated for storing and processing of NOPI data, as data, for example, stored in NOPI tables. In fact, multiple NOPI groups or pools can be designated for handling NOPI data. Also, a number of nodes or processing units can be grouped together to form one or more PI groups or pools designated for storing and processing PI data. This means that parallel database system can be configured such that NOPI data is stored only on the NOPI group(s) and PI data is stored in PI (Group). Of course, a super or primary group (or primary pool) can also be formed by combining the NOPI group(s) and PI group(s) to handle cases where both NOPI and PI are needed. In other words, all groups or pools can participate in some activities (e.g., optimization, handling permanent or spool data, data distribution, processing database queries across the PI and NOPI domains).

It will also be appreciated that a computing group or pool can be organized based on the cost and/or age of computing resources. As such, legacy resources or systems can be preserved and grouped together in a different group than a group formed by newer resources or systems. Furthermore, groups can be expanded or changed, where, for example, only one NOPI group or pool or many may be initially conceived, but at a later time, more NOPI pools can be created or the number of the NOPI pools can be reduced, and so on.

Although the example above discussed use of NOPI pools where nodes are grouped or pooled together, in light of the discussion above, it will be readily apparent that groups or pools of nodes of even processing units inside a single node can be designated for data based on or more characteristics of the data, including, for example, various degrees of priority or frequency of access to data (e.g., hot, warm, cold, deep cold). Also, various groups or pools can be formed as best suited for different data types, including, for example, data that is accessed via express requests or random IO that may diminish a Decision Support System (DSS) IO throughput capability of an indexed or hashed data which can generally be an important consideration. Other examples of data types that can be considered for defining or forming groups or pools of resources include dictionary data, monitoring data (e.g., logs, Real Simple Streaming (RSS), Database Query Log (DBQL), alerts, dumps, roles, profiles, access rights). As a result, some forms of data can be effectively segregated from hashed pools.

As another example, a NOPI group or pool can be provided with specialized hardware and/or software to hold different types of data, including, for example, Read Only low latency data that would be served by memory oriented hardware with HDD or SDD backing nonvolatile storage, Read/Write data with low latency that would be served by memory oriented hardware with SSD backing storage, and deep cold data that would be served by advances hardware and/or software compression features coupled with high capacity HDDs).

In addition, legacy hardware can be deployed to support a NOPI computing group or pool allowing for a new form of coexistence. As another feature, data that may be chronically skewed with hashing can be stored more effectively in one or more dedicated NOPI computing groups or pools. Also, some database operations, including, for example, backup, archive and restore can be performed more quickly by utilizing one or more dedicated NOPI computing groups or pools, by performing Insert-Select to and from the dedicated NOPI computing group(s) or pool(s).

It will also be appreciated that NOPI computing groups or pools can be expanded by adding more nodes and/or processing units in the nodes. Moreover, this can be accomplished without the need to move data. New tables could be effectively spread over the processing units of a computing group or pool. Existing tables could also be distributed to the processing units, for example via Insert-Select or a background utility.

In view of the foregoing, it will be appreciated that handling of data can include virtually any activity in a computing system or device as no limitation need to be imposed in what a computing group can do. These activities can, for example, include storing data, performing an operation, performing an operation on the data, processing of the data, data manipulation, data retrieval, processing of the data, processing of a request or database request, etc. Also, a computing group can includes one or more computing resources that are of the same or within a determined range of similarity.

It should be noted that techniques noted above are especially useful for large database systems, including single or multi-node, parallel database systems. A multi-node parallel database system can, for example, use a massively parallel processing (MPP) architecture or system to perform various database operations in parallel.

Figure 4:
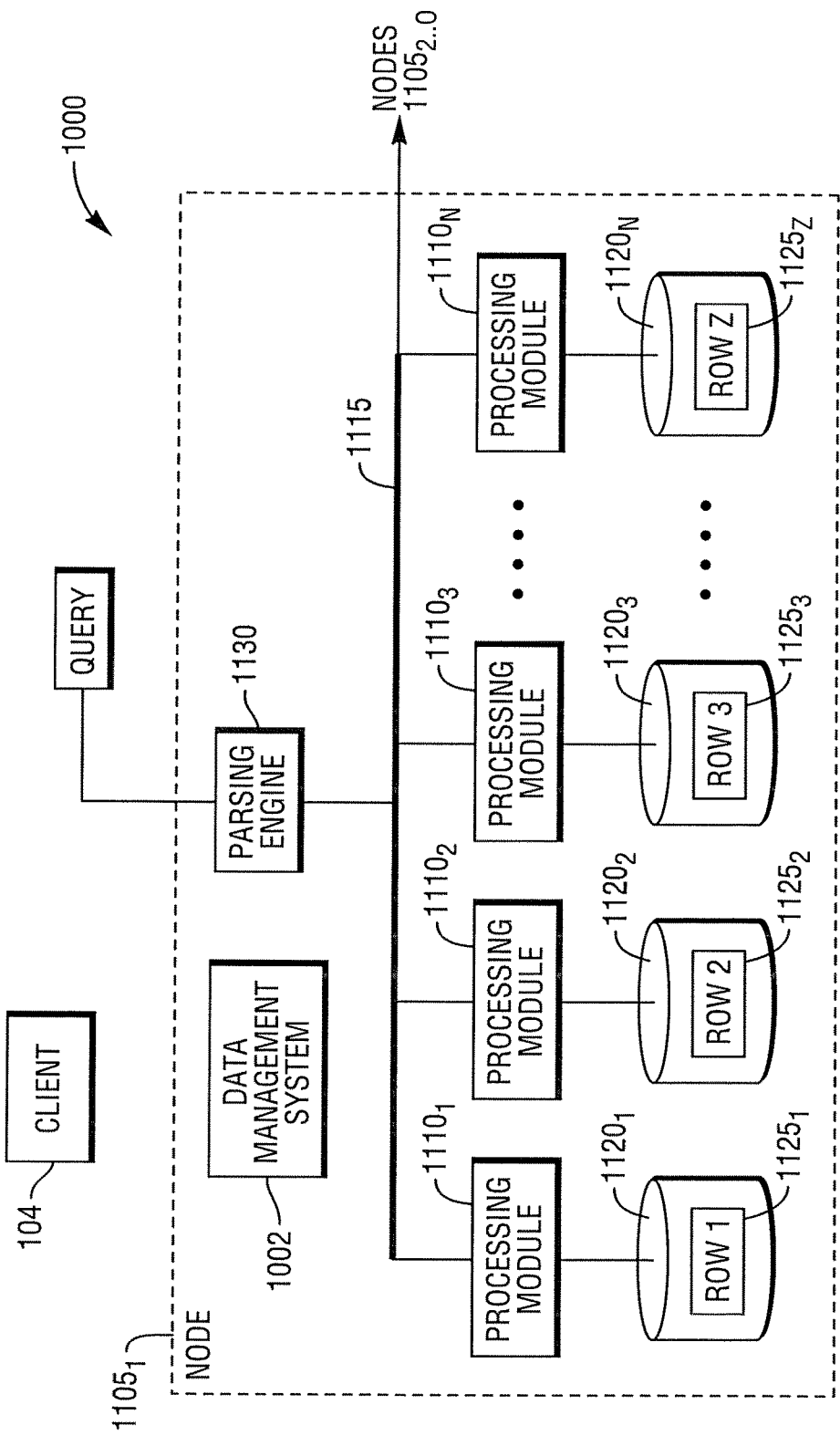
FIG. 4 depicts a database node of a database system or a Database Management System (DBMS) in accordance with one embodiment of the invention.

To further elaborate, FIG. 4 depicts a database node 1105 of a database system or a Database Management System (DBMS) 1000 in accordance with one embodiment of the invention. The DBMS 1000 can, for example, be provided as a Teradata Active Data Warehousing System. It should be noted that FIG. 4 depicts in greater detail an exemplary architecture for one database node $1105_1$ of the DBMS 1000 in accordance with one embodiment of the invention.

Referring to FIG. 4, the DBMS node $1105_1$ includes multiple processing units (or processing modules) 1110-N connected by a network 1115, that manage the storage and retrieval of data in data-storage facilities $1120_{1-N}$. Each of the processing units 1110-N can represent one or more physical processors or virtual processors, with one or more virtual processors (e.g., an Access Module Processor (AMP)) running on one or more physical processors in a Teradata Active Data Warehousing System). For example, when provided as AMPs, each AMP can receive work steps from a parsing engine (PE) 1130 which is also described below.

In the case in which one or more virtual processors are running on a single physical processor, the single physical processor swaps between the set of N virtual processors. For the case in which N virtual processors are running on an M-processor node, the node's operating system can schedule the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing units $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). Again, it should be noted that the DBMS 1000 may include additional database nodes $1105_{2-O}$ in addition to the database node $1105_1$. The additional database nodes $1105_{2-O}$ can be connected by extending the network 1115. Data can be stored in one or more tables in the data-storage facilities $1120_{1-N}$. The rows $1125_{1-z}$ of the tables can, for example, be stored across multiple data-storage facilities $1120_{1-N}$ to ensure that workload is distributed evenly across the processing units $1110_{1-N}$. In addition, a parsing engine 1130 can organize the storage of data and the distribution of table rows $1125_{1-z}$ among the processing units $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as, for example, SQL. Parsing engine 1130 can also handle logons, as well as parsing the SQL requests from users, turning them into a series of work steps that can be sent to be executed by the processing units $1110_{1-N}$.

For example, a client-side Host 1004 (e.g., a Personal Computer (PC), a server) can, be used to logon to the database system 1000 provided as a Teradata DBS server. Commination between the client-side Host 1004 and the database system 1000 can be facilitated by a database communicating mechanism, for example, by an ANSI CLI (Call Level Interface) standard that can include parcel requests and responses that facilitate the movement of files resident on the client-side host 1004 over to the database system 1000.

For example, the rows $1125_{1-z}$ can be distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index may be called the hash function. Some portion, possibly the entirety, of the hash value can be designated a "hash bucket". As such, the hash buckets can be assigned to data-storage facilities $1120_{1-N}$ and associated processing units $1110_{1-N}$ by a hash bucket map. The characteristics of the columns chosen for the primary index determine how evenly the rows are distributed.

Referring again to FIG. 4, it should be noted that a data management system 1002 can be provided as a central component for the processing units $1110_{1-N}$. However, it should be noted that each one of the processing units $1110_{1-N}$ can be effectively provided with a local data management system (not shown) that can serve as a local component and possibly collaborate with the central data management system 1002. Of course, various other configurations are possible and will become readily apparent in view of the foregoing.

Figure 5:
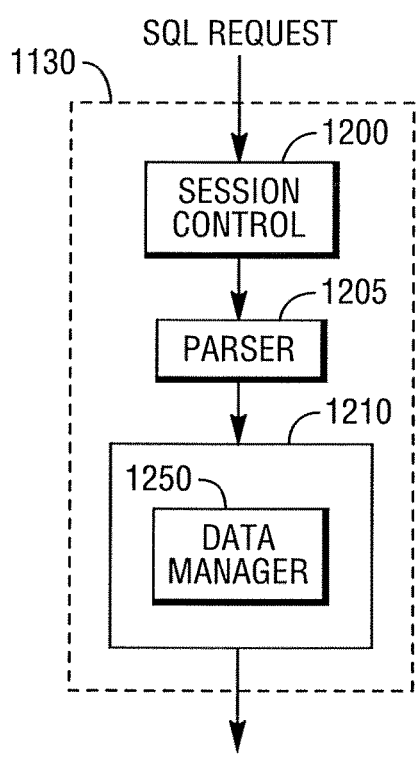
FIG. 5 depicts a Parsing Engine (PE) in accordance with one embodiment of the invention.

Referring now to FIG. 5, in one exemplary system, the parsing engine 1130 can be made up of three components: a session control 1200, a parser 1205, and a dispatcher 1210. In the example, the session control 1200 provides the logon and logoff function. It accepts a request for authorization to access the database, verifies it, and then either allows or disallows the access. When the session control 1200 allows a session to begin, a user may submit a SQL request, which is routed to the parser 1205. Regarding the dispatcher 1210, it should be noted that some monitoring functionality for data management and/or workload management may be performed by a regulator to monitor workloads and usage of the resources, for example, by using internal messages sent from the AMPs to the dispatcher 1210. The dispatcher 1210 can provide an internal status of every session and request running on the system, for example, by using internal messages sent from the AMPs to the dispatcher 1210. In the example, the dispatcher 1210 can provides an internal status of every session and request running on the system. As such, at least part of a database management (1250) can be provided by the dispatcher 1210 in accordance with one embodiment of the invention. The dispatcher 1210 can also operate as a workload dispatcher in order to effectively manage workloads, as well as storage and processing of data by using designated computing groups in order to allow for more efficient processing of data and/or operation(s) in the DBMS 1000 based on or more determined characteristics of data and/or operation(s).

Figure 6:
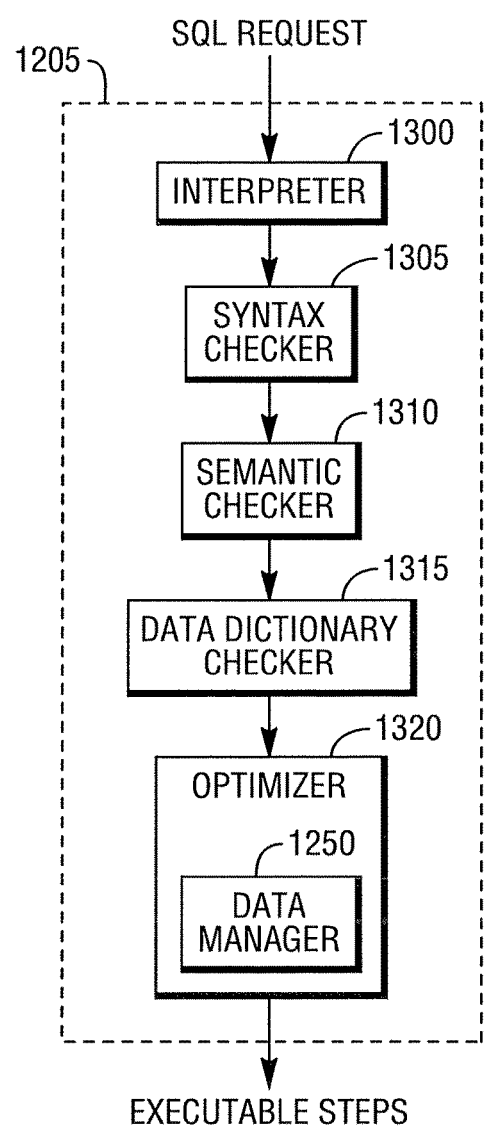
FIG. 6 depicts a Parser in accordance with one embodiment of the invention.

As illustrated in FIG. 6, the parser 1205 interprets the SQL request 1300, checks it for proper SQL syntax 1305, evaluates it semantically 1310, and consults a data dictionary to ensure that all of the objects specified in the SQL request actually exist and that the user has the authority to perform the request 1305. Finally, the parser 1205 runs an optimizer 1320, which generates the least expensive plan to perform the request by considering assignment to one or more designated computing groups. As such, at least part of data management system (1250) can be provided by the optimizer 3120 in accordance with one embodiment of the invention.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, at least partly implemented by a device, for handling data and one or more operations associated with the data in a database system, wherein the method comprises:
    providing multiple computing resources each configured to store and process the data independently from each other and to independently provide the stored data in response to database queries from the database system;
    assigning a selected one of multiple computing groups of the computing resources of the database system to handle the data and one or more of the database queries associated with the data, including storing and processing of database requests associated with the data, based on one or more determined characteristics associated with the data, wherein
        each one of the multiple computing groups of the computing resources includes one or more of the computing resources designated to be part of that computing group,
        each one of the multiple computing resources includes one or more designated processors designated to process respective data stored only in one or more designated storage devices that are designated to store the respective data only for the computing resource, such that the one or more processors are configured to process database requests for the respective data stored only in the one or more storage devices, and
        at least one of the computing groups includes one or more computing resources that are within a determined range of similarity;
    providing first data of a first data characteristic to a first computing group of the computing groups of the database system designated for storing and processing of the data of the first data characteristic, wherein the first data characteristic includes not being indexed by the first computing group, and the first data is stored in one or more designated storage devices associated with the first computing group as non-indexed data;
    providing second data of a second data characteristic to a second computing group of the computing groups of the database system designated for storing and processing of the data of the second data characteristic, wherein the second data characteristic includes being indexed by the second computing group, and the second data is stored one or more designated storage devices associated with the second computing group as indexed data by indexing the second data with respect to at least one data index;
    not allowing the first data of the first data characteristic to be provided to and processed by the second computing group;
    not allowing the second data of the second data characteristic to be provided to and processed by the first computing group; and
    providing, independently by the first or second computing group, the stored first or second data in response to the one or more database queries of the database system.

2. The method of claim 1, the handling of the data includes one or more of the following: storing the data, performing an operation on the data, processing of the data, manipulation of the data, retrieval of the data, and processing of a database request associated with the data.

3. The method of claim 1, the method further comprises:
    not storing the first data of the first data characteristic to the second computing group of the computing groups of the database system.

4. A device that includes one or more physical processors handling data and one or more operations associated with the data in a database system, wherein the device is configured to:
    provide multiple computing resources each configured to store and process the data independently from each other and to independently provide the stored data in response to database queries from the database system;
    assign a selected one of multiple computing groups of the computing resources of the computing system to handle the data and one or more of the database queries associated with the data, including storing and processing of database requests associated with the data, based on one or more determined characteristics associated with the data, wherein
        each one of the multiple computing groups of the computing resources includes one or more of the computing resources designated to be part of that computing group,
        each one of the multiple computing resources includes one or more designated processors designated to process respective data stored only in one or more designated storage devices that are designated to store the respective data only for the computing resource, such that the one or more processors are configured to process database requests for the respective data stored only in the one or more storage devices, and at least one of the computing groups includes one or more computing resources that are within a determined range of similarity;

provide first data of a first data characteristic to a first computing group of the computing groups of the database system designated for storing and processing of the data of the first data characteristic, wherein the first data characteristic includes not being indexed by the first computing group, and the first data is stored in one or more designated storage devices associated with the first computing group as non-indexed data;

provide second data of a second data characteristic to a second computing group of the computing groups of the database system designated for storing and processing of the data of the second data characteristic, wherein the second data characteristic includes being indexed by the second computing group, and the second data is stored in one or more designated storage devices associated with the second computing group as indexed data by indexing the second data with respect to at least one data index;

not allow the first data of the first data characteristic to be provided to and processed by the second computing group;

not allow the second data of the second data characteristic to be provided to and processed by the first computing group; and provide, independently by the first or second computing group, the stored first or second data in response to the one or more database queries of the database system.

5. The device of claim 4, wherein the handling of the data includes one or more of the following: storing the data, performing an operation on the data, processing of the data, manipulation of the data, retrieval of the data, and processing of a database request associated with the data.

6. The device of claim 5, wherein the device is further configured to not to store the first data of the first data characteristic to the second computing group of the computing groups of the database system.

7. A non-transitory computer readable storage medium storing at least executable code for a database system that handles data and one or more operations associated with data, wherein the executable code when executed by the database system cause the database system to:

provide multiple computing resources each configured to store and process the data independently from each other and to independently provide the stored data in response to database queries from the database system;

assign a selected one of multiple computing groups of the computing resources of the computing system to handle the data and one or more of the database queries associated with the data, including storing and processing of database requests associated with the data, based on one or more determined characteristics associated with the data, wherein each one of the multiple computing groups of the computing resources includes one or more of the computing resources designated to be part of that computing group, each one of the multiple computing resources includes one or more designated processors designated to process respective data stored only in one or more designated storage devices that are designated to store the respective data only for the computing resource, such that the one or more processors are configured to process database requests for the respective data stored only in the one or more storage devices, and at least one of the computing groups includes one or more computing resources that are within a determined range of similarity;

provide first data of a first data characteristic to a first computing group of the computing groups of the database system designated for storing and processing of the data of the first data characteristic, wherein the first data characteristic includes not being indexed by the first computing group, and the first data is stored in one or more designated storage devices associated with the first computing group as non-indexed data;

provide second data of a second data characteristic to a second computing group of the computing groups of the database system designated for storing and processing of the data of the second data characteristic, wherein the second data characteristic includes being indexed by the second computing group, and the second data is stored in one or more designated storage devices associated with the second computing group as indexed data by indexing the second data with respect to at least one data index;

not allow the first data of the first data characteristic to be provided to and processed by the second computing group;

not allow the second data of the second data characteristic to be provided to and processed by the first computing group; and provide, independently by the first or second computing group, the stored first or second data in response to the one or more database queries of the database system.

8. The non-transitory computer readable storage medium of claim 7, wherein the handling of the data includes one or more of the following: storing the data, performing an operation on the data, processing of the data, manipulation of the data, retrieval of the data, and processing of a request or database request associated with the data.

* * * * *